INVENTORS
NOBUO IZAWA
YOSHIO TAMURA
AKIHISA FURUTANI
KAZUO OKAMOTO

ATTORNEYS

United States Patent Office 3,518,252
Patented June 30, 1970

3,518,252
PRODUCTION OF ALIPHATIC SCHIFF BASES AND DIAMINOALKANONE DERIVATIVES THEREOF
Nobuo Izawa, Sakai, and Yoshio Tamura and Akihisa Furutani, Mishima-gun, Osaka-fu, and Kazuo Okamoto, Osaka, Japan, assignors to Kanegafuchi Boseki Kabushiki Kaisha, Tokyo, Japan
Filed Apr. 14, 1966, Ser. No. 542,614
Claims priority, application Japan, Apr. 14, 1965, 40/22,022
Int. Cl. C07d 27/14, 29/38, 41/00
U.S. Cl. 260—239  3 Claims

ABSTRACT OF THE DISCLOSURE

A process for producing a Schiff base of the formula:

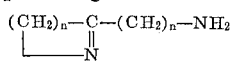

Figure 1:
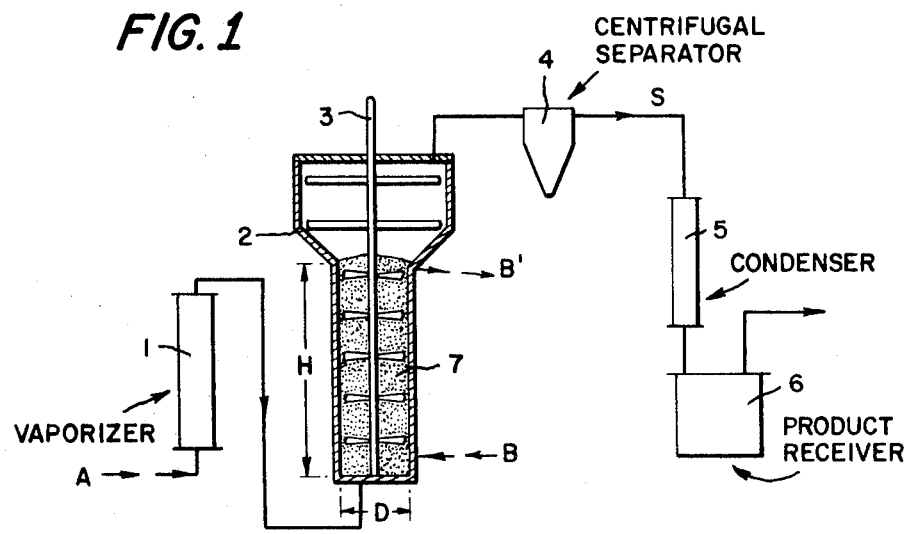

wherein $n$ is 3–11 by the reaction between the corresponding 5–13 membered lactam and a decarbonation-condensing agent such as calcium oxide or calcium hydroxide, characterized by continuously contacting the lactam in the state of a gas with the condensing agent in solid particulate form at an elevated temperature, preferably within the range of 320–550° C.

---

This invention relates to the preparation of aliphatic Schiff bases and diaminoalkanones derived therefrom by reacting lactams with oxides or hydroxides of alkali or alkaline earth metals or mixture thereof. More particularly, this invention relates to an improvement of the above method by conducting the same in a gas-solid reaction system.

It is known to produce aliphatic Schiff bases by reacting in a liquid system a lactam with an oxide or hydroxide of an alkali or alkaline earth metal or a mixture thereof as a decarbonation condensation agent (Japanese Pat. No. 405,759, German Pat. No. 1,131,697, etc.). This reaction, when, for example, an unbranched lactam and calcium oxide are employed, is illustrated by the following equation:

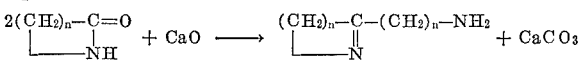

All the known methods are conducted in a liquid system by mixing the lactam and decarbonating condensation agent, heating the mixture to a melt, further gradually heating the resulting mixture to 400 to 500° C. for more than 2 hours to effect the reaction and distilling the product. It makes the reaction mixture highly viscous and the agitation extremely difficult or impossible with the proceeding of the reaction in keeping such thermounstable organic amines at such a high temperature as 400 to 500° C. for a long period. As the result, there are various disadvantages: e.g. the temperature and the concentration in the reaction system become extremely nonuniform; the reaction does not satisfactorily go to completion; the formation of reddish-brown resinous products is increased; the removal of the product from the reactor and the purification thereof are difficult; cleaning of the reactor is extremely difficult. The yield of the product is of course very low. For example, according to the specification of Japanese Pat. No. 405,759 (Publication No. 16015/1962) the yield of the objective material is only about 60%. Furthermore, the crude product must be treated with concentrated hydrochloric acid and then with strong alkali for the purification. This causes conversion of unreacted lactam into the alkali salt of amino carboxylic acid whose reconversion into the starting lactam for reuse is difficult. Moreover, there must be employed for every 1 molar equivalent of the lactam, 2 to 4 molar equivalents of the condensation agent, which correspond to 4 to 8 times the stoichiometric theoretical amount based on the lactam and about 6 to 12 times the amount based on the product. Furthermore, according to the known methods, it is very difficult or rather impossible to perform the reaction continuously. These disadvantages have made the industrial practice of this method impossible from technical and economical viewpoints.

We have found that these drawbacks can be overcome by performing the said reaction in a gas-solid contact flow system.

The object of this invention is to provide an improved continuous process for preparing a Schiff base (and diaminoalkanone derived therefrom) from a lactam and such a condensing agent as mentioned before in high yield with great efficiency and facility by the use of a simple reactor.

The present process is characterized by contacting a gaseous 5 to 13-membered lactam with a solid decarbonation-condensing agent in a fluidized bed or a moving bed.

More particularly, the object of the present invention is achieved, by utilizing the so-called gas-solid contact flow reaction system, which comprises contacting a gaseous lactam under nearly atmospheric pressure with small solid particles of the condensing agent which is under fluidized condition or moving slowly on a belt conveyer or the like over a very short period of time (e.g. a few seconds) and condensing the resulting Schiff base in the gaseous state.

According to the present process, the feed of the reactants and removal of the product, the spent condensing agent (mostly in the form of carbonate) and unchanged or unreacted materials from the reactor can be carried out completely in a continuous manner. However, a somewhat intermittent feed or flow of the solid condensing agent is possible without departing from the essential advantages of the present process.

Outstanding advantages of the afore-disclosed process of this invention may be understood from the fact that, in the known methods, the reaction mixture becomes extremely viscous or solidified and distillation of the product and unreacted lactam is difficult even at the highest reaction temperature of 400 to 500° C. which is quite beyond the boiling points of these materials under atmospheric pressure (240 to 300° C. and 240 to 320° C. respectively). Furthermore, in the present process, the temperature may be precisely controlled, despite the fact that the reaction temperature is almost the same as that in the known methods. Further, the reaction may be completed in an extremely short contact time which is one-hundredth to one-ten-thousandth of that in the known methods and the product can be easily and continuously recovered outside the reactor. Accordingly, the product is colored only in light yellow or yellow and contains only undetectable amounts of by-products. In addition to this, the conversion is extremely high and may reach above 80%. The said advantages makes the reactor extremely small and the operation extremely easy and also facilitates the separation of the objective product and unchanged material, purification of the product and recovery of unreacted lactam. The necessary amount of the starting material may be quantitative and the yield reaches over 95%. The sufficient amount of the condensing agent may be only 0.7 to 4 times the stoichiometric theoretical amount based on the fed lactam.

Figure 2:
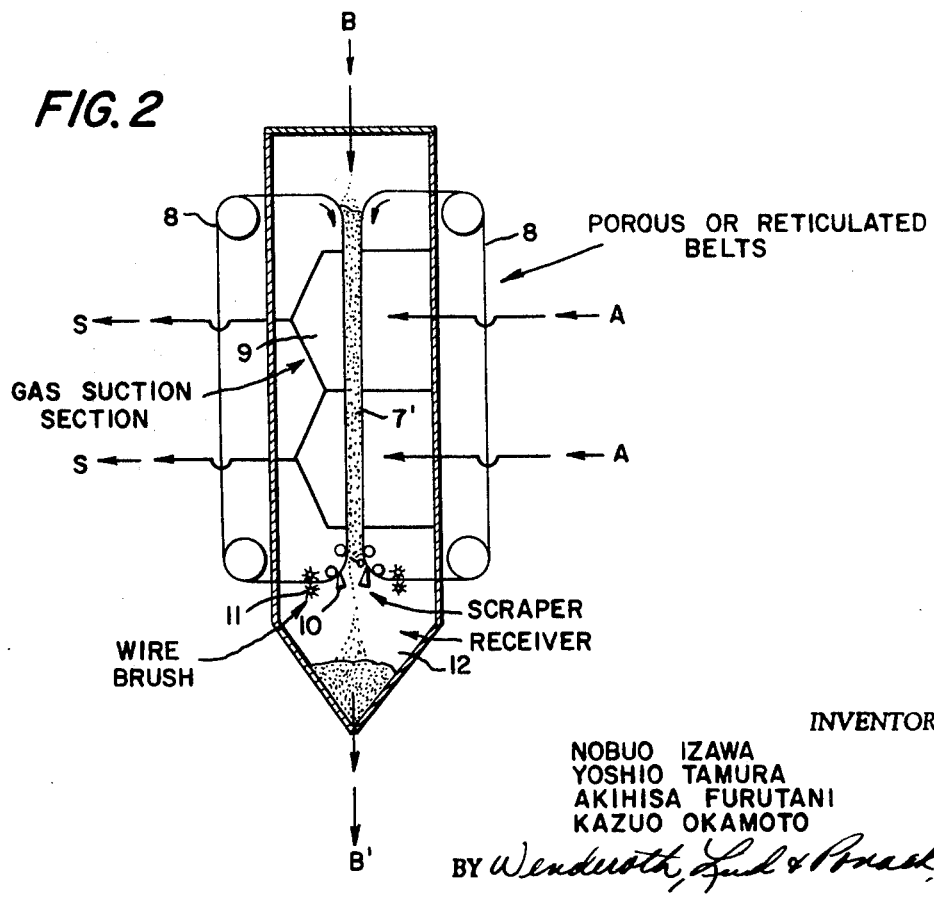

The present invention will be explained in more details by referring to the accompanying drawings wherein:

FIG. 1 is a schematic view of an apparatus which may be used in carrying out the process of this invention; and FIG. 2 is a view similar to FIG. 1 but showing another embodiment of apparatus.

Hereinafter, the starting lactam will sometimes be referred to as A, condensing agent as B, spent condensing agent (mostly in the form of carbonate) as B' and the objective compound (Schiff base) as S, for convenience of explanation.

Referring to the drawings, more particularly to FIG. 1, the apparatus comprises a vaporizer 1, reactor 2, agitator 3, cyclone or mechanical centrifugal separator 4, condenser 5 and product receiver 6. The reactor comprises a fluidized reaction bed 7.

A predetermined amount of the starting material A is continuously and constantly fed to the vaporizer 1 in which A is vaporized and heated to 300 to 500° C. According to circumstances, A is mixed with an inert gas (usually nitrogen gas) when or after A is evaporated. The resulting reaction gas is charged from the bottom of the reactor 2 (i.e. the bottom of the reaction bed 7). The bed comprises granular dry B (containing B' except just when the reaction apparatus is set for operation) which is kept under fluidized condition by means of the reaction gas or an inert gas and the agitator 3. The temperature of the reaction bed 7 may range from 320 to 550° C., advantageously from 330 to 480° C. The temperature may be precisely controlled at an arbitrarily fixed temperature within the said range depending upon the characteristic of the fluidized bed reactor. Furthermore, if desired, a preferable temperature gradient may be set arbitrarily between the lower part and the upper part of the reaction bed 7. The rate of flow of the material A may be selected properly. For example, when B is calcium oxide, the ratio of the feed rate F (mole/hr.) of the material A, to the weight W (kg.) of unchanged B present in the reaction bed 7, i.e. F/W, may be selected from 3 to $10^3$, preferably $4 \times 10^2$ to $7 \times 10^2$ (mole/kg. hr.) and the contact time of the present reaction is determined depending on the said ratio. In case of the use of calcium hydroxide, it is preferable to select a value (F/W) about $\frac{1}{5}$–$\frac{1}{30}$ time the above mentioned value.

The practical residence time of the reaction gas in the reaction bed 7 is about 0.5 to 60 seconds, and the volume of the reactor 2 is extremely small as compared with the output.

The gas discharged from the reaction bed 7, after the accompanying solid particles are removed in the cyclone or mechanical centrifugal separator 4 set in or outside the reactor, is liquidized in the condenser 5 and introduced in the product receiver 6. Although the product S is a liquid at room temperature, the temperature of the condenser 5 and the receiver 6 is preferably not kept below 20° C. in order to avoid precipitation of the unchanged A which is contained in the product especially when the conversion is below 80%. Of course, this is not the case when the product receiver 6 is employed as a cooling separator.

Furthermore, if desired, there may be placed water, an organic solvent or an organic solvent containing water in the receiver 6 in which the product may be collected by dissolving. As the organic solvent, there may be preferably employed a solvent to be used in the hereafter-described procedure for purifying the crude Schiff base. The product which is not collected here and discharged with the inert gas and the like may be collected by condensation at a lower temperature.

A fixed amount of the other material B is constantly charged from the lower or upper part of the reactor 2 by using a rotary feeder, a screw feeder or the like. The feed rate of B may be selected from 0.25 to 10 times that of A as calculated by molarity (i.e. 0.5 to 20 equivalent times), preferably 0.35 to 2 times. The material B fed into the reaction bed 7 is immediately mixed with the particles present in the reaction bed 7 and reaches the specified reaction temperature. A fixed amount of the particles containing large amounts of B' and deactivated B is constantly discharged from a symmetrical position which is as remote as possible from the feed spot of B by using a screw feeder or the like or by overflow. It may be advantageous to introduce a small amount of an inert gas (usually nitrogen) into the screw feeder for charge or discharge or pipes. The flow of the inert gas in the screw feeder for discharge or the pipes is effective for describing and collecting a small amount of the objective material S or the unchanged material A which is adsorbed on the discharged particles.

It is preferable that 80% or more of B to be charged have the particle diameters ranging from 0.04 to 4 mm. Moreover, it may be an efficient method for keeping fluidization condition to admix B with inert particles which have little affinity with the materials in the reaction system or are of considerably small surface area. Although it is also extremely effective for the same purpose to mix the reaction gas with an inert gas like nitrogen, the use of it by more than the number of moles of the starting material A usually decreases the reaction rate and is not preferable. Furthermore, it is also preferable to conduct the reaction at a reduced pressure.

The diameter D of the main reaction bed 7 of the reactor 2 is preferably so selected that the linear velocity of the total reaction gas exceeds the minimum fluid velocity needed to initiate fluidization of the solid particles, i.e. the minimum fluidizing velocity. The rato of the depth H of the reacton bed 7 to its diameter D may be 0.2 to 20. Furthermore, it is advantageous that the diameter of the upper part of the reactor 2 is larger than that of the reaction bed, because this may greatly decrease scattering of the solid fine particles and entrainment of the particles by the effluent reaction gas. It is extremely effective to set stirrer blades also in the upper part of the reactor 2 which contain a small amount of the solid particles and in some cases this makes the cyclone or mechanical centrifugal separator unnecessary. Also it may be advantageous to employ a reactor shaped entirely or partly as an inverted cone.

The agitator 3 is usually fitted with a number of blades of a shape which has an action of forcing up the contents of the reaction bed. Usually blades in the shape of twisted propellers or oars are used. However, in the upper part of the reactor 2 which contains a small amount of the solid, there are employed blades which have a strong action of pushing out the solid particles toward the periphery, and blades which also have an action of pushing down the particles are especially effective. Revolutions of the agitator 3 may usually range from 20 to 3000 r.p.m. The agitator 3 fitted with these blades serves to prevent the lowering of the gas-solid contact efficiency which is a common drawback of a fluidized bed reactor. Furthermore, when small particles of B are charged from a relatively lower part of the reaction bed 7 and discharged from the upper part, the agitator exerts an effect to decrease the rate of mixing the particles upward and downward and predominantly remove the spent particle B' or deactivated B having a longer residence time. That is to say, the agitator serves to furnish the said reactor with characteristics of the moving bed type reactor.

Heating and cooling may be performed by any of known methods. It is greatly effective for controlling the temperature of the present reaction which is extremely exothermic to feed the reaction gas, the inert gas and B whose temperatures are relatively lower than that of the reaction section.

FIG. 2 schematically shows a moving bed reactor. However, the process to practice the present invention using the said apparatus is common in many respects to the process using the fluidized bed reactor shown in FIG. 1. In other words, the procedure to vaporize A, to regulate the temperature and if necessary to mix an inert gas, the procedure to trap the product and the reaction condition like the reaction temperature and the gas-solid contact time may be almost the same as those in the fluidized bed reactor. Moreover, the procedure to keep better fluidization condition may be advantageously employed without any inconvenience for performing the reaction smoothly. The reaction gas is charged from one side of the reactor, passes through a bed 7' of granular B which is moving between a pair of porous or reticulated belts 8, 8 moving vertically downward as shown, and reacts with B by contact therewith to produce the objective product S. The resulting gas is discharged through the gas suction section 9, connected with a blower, an ejector or the like (not shown). The gas collected from the suction section is liquidized in a condenser (not shown) and collected. Unlike the fluidized bed reactor, a particle separator is not necessary. Another material B is fed from a storage like a hopper in a similar manner to that in the fluidized bed process to the top of the reaction bed 7 which is held between two belts 8. Particles of B whose relative positions are fixed between the two belts contact and react with the reaction gas while moving gradually downward with the belts 8. As the reaction proceeds, the particles begin to stick together (this sticking prevents the particles from slipping through space between the belts 8). However, the said sticking does not so hinder the flow of the reaction gas. The sticking between the particles is extremely weaker as compared with that in the batch-type liquid-solid contact method and the stuck particles may be crushed by a slight mechanical shock. The surface of the particles is only slightly colored in brown or grey.

It is not preferable that the particles stay under the said reaction conditions for 3 or more hours, especially for 4 or more hours. The particles are exfoliated and fall from the belts, when they reach the lowest opened part where the two belts 8 move away from each other. The unexfoliated particles may be scraped off by a scraper 10 and then the belts may be cleaned by a wire-brush 11 and the like. If necessary, the belts may be washed in a water tank containing a detergent. B' which falls is removed after being crushed in a receiver 12 if necessary.

The feed of B may be varied over the same range as that described in the fluidized bed process, but the preferred feed rate of B is slightly higher than that in the fluidized bed process (e.g. 0.5 to 3.5 times the moles of the feed rate of the lactam.) It is preferable that 80% or more of B have a relatively larger particle diameter ranging from 0.1 to 10 mm. Also there may be employed a moving bed reactor in which B moves between and together with two belts or on a single belt moving horizontally.

The space between the two belts 8 may be usually 1 to 30 cm. and less than one-half the width of the belt. Furthermore, it is an advantageous procedure to feed the reaction gas of an appropriate flow rate separately to each of the reaction sections of particle bed held between the two belts 8 and divided as illustrated in FIG. 2 (e.g. upper and lower sections, upper, middle and lower sections, more than three sections). This is because B in the reaction particle bed is consumed as the reaction proceeds, the reactivity of residual B is inclined to be decreased and a distribution of B particles having uniform activity in entirety can not be expected. On the other hand, the flow resistance of the particle bed for the reaction gas is slightly increased as the reaction proceeds and causes a partial disproportion of the flow rate. From this point of view, it is advantageous to fix the flow rate for each section of the reaction particle bed so that each reaction gas (lactam) fed into the reaction sections may achieve high conversion equally. Nevertheless, high conversion may be achieved without dividing the reaction bed as designated above. One of the drawbacks of the moving bed reactor is that the temperature control is somewhat difficult as compared with the fluidized bed reactor, but the temperature may be practically controlled near a given temperature by adjusting the temperature of the reaction gas to be charged.

The lactam, the starting material A of this invention, may be not so pure as that used in the production of polyamide fibers. Thus, for example, there may be well employed the lactams which are produced by simple continuous or batch distillation under reduced pressure of lactam obtained in the production of polyamides as recovered ones, crude lactams obtained by depolymerization of oligomers or waste polyamides or aqueous solution of crude lactams obtained in the procedure for producing lactams. Smaller water content of the lactams is more preferable, but complete removal of water is not necessary.

As the starting material of the present process, 5 to 13-membered lactams with or without branched chain(s). In case of branched lactams, each branch chain should have not more than 6 carbon atoms. Examples of such lactams are ω-laurolactam, ω-caprylolactam, ω-enatholactam, 5-methyl-ε-caprolactam, ε-caprolactam and α-pyrrolidone.

Examples of B (decarbonation condensing agents) are calcium hydroxide, calcium oxide, barium oxide, magnesium ozide and soda lime, of which calcium oxide is most preferable. Commercially available industrial grades of the said materials are satisfactory.

As described hereabove, according to the process of this invention, there is removed the drawback of the known liquid-solid batch methods that the reaction mixture becomes viscous or solidified, and the objective material of good quality is obtained in high yield during an astonishingly short reaction time, the reactor is made extremely small-sized (for example, the volume of the fluidized bed reactor shown in FIG. 1 for the production of 10 kg. of S per day is only 5 to 30 liters including the upper space containing a dilute-phase of B particles) and there can be removed easily and continuously the small particles of spent B, which removal, in the known methods, was very difficult due to the fact that the reaction mixture becomes extremely viscous or solidified. Thus, the complete continuous process of high efficiency for the present reaction has been realized by this invention.

The crude S (Schiff base) prepared according to the present process usually contains 55 to 85% by weight of the Schiff base and the major part of the remainder consists of unreacted A. Since the said crude S contains little resinous substance, unreacted A are easily crystallized by cooling the crude S below room temperature, especially below 10° C. The crystals deposited are separated by decantation, filtration, centrifuging or other methods to give the product whose content of S is above 80%. Although the said product of a high S content may be purified by fractional distillation under reduced pressure, a procedure for separating S as the carbonate of the corresponding diamino ketone is superior. Namely, to a solution of the crude S in a mixture of water of 2 to 10 molar equivalents per mole of the Schiff base and an organic solvent selected from alcohols such as methyl alcohol, ethyl alcohol, isopropyl alcohol, 2-ethylhexylalcohol and ethylene glycol, carbonyl compounds such as acetone, methyl ethyl ketone, propionaldehyde, n-butyl aldehyde and furfural, ethers such as dioxane and tetrahydrofuran, esters such as methyl acetate and ethyl acetate, nitriles such as acetonitrile and propionitrile, formamide, dimethylformamide, dimethyl sulfoxide and solvent mixtures thereof which can dissolve water and lactams, there is added carbonic acid gas, liquid carbon dioxide or Dry Ice. The carbonate of the diamino ketone immediately precipitates from the solution which contains unchanged A. However, the said separation from A is not always perfect when the content of S in the crude product is below 80%. The said carbonate is carefully heated at 120 to 200° C. to liberate carbon dioxide and water, reconverting into the Schiff base. However, in some cases there are produced in part unfavorable high-boiling materials arising from formation of intermolecular Schiff bases. Accordingly, the carbonate of the diamino ketone may be preferably employed in place of the diamino ketone or its intramolecular condensation product, i.e. the Schiff base, when the said material can be used in the form of the carbonate. When further purification of the carbonate of the diamino ketone is necessary, a suspension of the carbonate in one of the afore-disclosed organic solvents is heated at 40 to 100° C. to liberate easily carbon dioxide and the suspension is dissolved. To the resulting solution, there is added again carbonic acid gas, liquid carbon dioxide or Dry Ice to separate the carbonate of higher purity. On the other hand, since the unchanged lactam separated from the diamino ketone remains in the organic solvent employed, the major part of the lactam can be recovered by removal of the solvent followed by vacuum distillation or fractional distillation of the residue.

When a sufficient amount of water, an organic solvent or a mixture of them is placed in the product receiver, the unchanged material naturally does not precipitate in the receiver. Furthermore, in the presence of water or an organic solvent containing water, the Schiff base in the receiver is partly hydrolyzed to the diamino ketone. In these cases, the product can be also purified by the usual purification procedure which comprises adding a necessary amount of water and then adding carbonic acid gas, liquid carbon dioxide or Dry Ice to produce the carbonate.

The following examples are given by way of illustration. In these examples the various symbols have the following significances:

A—Lactam used.
B—Condensing agent.
$F_A$—Rate of fed of A.
$F_B$—Rate of feed of B.
$F_{NA}$—Rate of nitrogen fed together with A.
$F_{NB}$—Rate of nitrogen fed together with B.
V—Volume on main fluidized bed or layer B.
$W_V$—Weight of B in the volume V.

EXAMPLE 1

A—ε-Caprolactam.
B—Calcium oxide.
Fluidized bed reactor.
$F_A$=6.8 kg./hr. (60 mole/hr.).
$F_B$=2.5 kg./hr. (45 mole/hr.).
$F_{NB}$=5.5 L./hr. (NTP) unit).
V=5.0 liters.
$W_V$=ca. 4.2 kg. (Weight of unchanged B in the said bed: W=ca. 1.5 kg.)
Reaction temperature—358° C.

Under these conditions, there was obtained in a uniform and continuous manner 5.8 kg. per hour of crude Schiff base (7-(ω-aminopentyl) - 3,4,5,6 - tetrahydro-2H-azepine) containing 71% by weight of the Schiff base (conversion=75%; 4.1 kg./hr. of 100% Schiff base).

The thus-obtained crude Schiff base was cooled to 0° C. to deposit crystals of unchanged lactam, which were removed by centrifuging. As the results, the concentration of the Schiff base increased to 83% by weight. To a solution of the said product in about 3 times of its weight of methanol, there were added 1.2 times the theoretical amount of water and 1.3 times the theoretical amount of carbonic acid gas to deposit the carbonate of 1,11-diaminoundecan-6-one. This was separated by centrifuging and the purity of the thus-obtained carbonate was above 99%. The yield from the crude product was 96%. This carbonate was rapidly heated to 175° C. under a reduced pressure of 5 mm. Hg to develop $CO_2$ gas and then water which was distilled off. Distillation under the reduced temperature was continued to obtain the objective Schiff base (purity 99.5%), the yield of which based upon the carbonate was 95%. The Schiff base thus obtained was colorless transparent liquid.

EXAMPLE 2

A—ε-Caprolactam.
B—Calcium oxide.
Fluidized bed reactor.
$F_A$=6.8 kg./hr. (60 mole/hr.).
$F_B$=2.8 kg./hr. (50 mole/hr.).
$F_{NB}$=55 L./hr.
V=5.0 L.
$W_V$=ca. 4.1. kg.
Reaction temperature: 400° C. in the lower part and 375° C. in the upper part of the reaction bed.

Under these conditions, there was obtained in a uniform and continuous manner 5.7 kg. per hour of the corresponding crude Schiff base containing 80% of the base (conversion=83%; 4.5 kg./hr. of 100% Schiff base). A solution of the thus-obtained crude Schiff base in about 3 times of its amount of acetone, there were added 1.1 times the theoretical amount of water and 1.3 times the theoretical amount of carbonic acid gas to deposit the carbonate of 1,11-diaminoundecan-6-one. This was separated by centrifuging and the purity of the thus-produced carbonate is 99%. The product was purified in the same manner as in Example 1 to obtain the objective Schiff base of 99% purity.

EXAMPLE 3

A—ε-Caprolactam.
B—Calcium hydroxide.
Moving bed reactor.
$F_A$=4.5 kg./hr. (40 mole/hr.).
$F_B$=2.96 kg./hr. (40 mole/hr.).
$F_{NA}+F_{NB}$=200 L./hr.
V=25.5 L.
$W_V$=18 kg.
Reaction temperature—370° C.

Under these conditions, there was obtained in a uniform and continuous manner 3.8 kg. per hour of the corresponding crude Schiff base containing 77% of the Schiff base (conversion=80%; 2.8 kg./hr. of 100% Schiff base). The crude product was purified in the same manner as in Example 1.

EXAMPLE 4

A—ω-Enantholactam.
B—Calcium oxide.
Fluidized bed reactor.
$F_A$=7.6 kg./hr. (60 mole/hr.).
$F_B$=2.8 kg./hr. (50 mole/hr.).
$F_{NB}$=55 L/hr.
V=5.0 L.
$W_V$=ca. 4.1 kg.
Reaction temperature—410° C.

Under these conditions, there was obtained in a uniform and continuous manner 6.5 kg. per hour of a crude product containing 81% of the corresponding Schiff base (conversion=85%; 5.3 kg./hr. of 100% Schiff base). The crude product was purified in the same manner as in Example 1 to obtain the objective Schiff base of 99.5% purity.

EXAMPLE 5

A—ω-Caprylolactam.
B—Calcium oxide.
Fluidized bed reactor
$F_A$=8.5 kg./hr. (60 mole/hr.).
$F_B$=2.8 kg./hr. (50 mole/hr.).
$F_{NB}$=80 L/hr.
V=5.0 L.
$W_V$=ca. 4.0 kg.
Reaction temperature—420° C.

Under these conditions, there was obtained in a uniform and continuous manner 7.6 kg. per hour of crude product containing 60% of the corresponding Schiff base (conversion=65%; 4.6 kg./hr. of 100% Schiff base). The crude product was purified in the same manner as in Example 1 to obtain the objective Schiff base of 99.5% purity.

EXAMPLE 6

A—ω-Laurolactam.
B—Calcium oxide.
Moving base reactor
$F_A = 12.6$ kg./hr. (64 mole/hr.).
$F_B = 5.0$ kg./hr. (90 mole/hr.).
$F_{NA} + F_{NB} = 400$ L/hr.
$V = 5.1$ L.
$W_M = $ ca. 4.6 kg.
Reaction temperature—430° C.

Under these conditions, there was obtained in a uniform and continuous manner 11.9 kg. per hour of crude product containing 47% of the corresponding Schiff base (conversion=49%; 5.6 kg./hr. of 100% Schiff base). The crude product was subjected to purification in the same manner as in Example 1 to obtain pure Schiff base.

EXAMPLE 7

A—5-methyl-ε-caprolactam.
B—Calcium oxide.
Fuidized bed reactor
$F_A = 7.6$ kg./hr. (60 mole/hr.).
$F_B = 2.5$ kg./hr. (45 mole/hr.).
$F_{NB} = 55$ L/hr.
$V = 5.0$ L.
$W_V = $ ca. 4.2 kg.
Reaction temperature—400° C.

Under these conditions, there was obtained in a uniform and continuous manner 6.7 kg. per hour of crude product containing 66% of the corresponding Schiff base (conversion=70%; 4.4 kg./hr. of 100% Schiff base). The crude product was purified in the same manner as in Example 1.

EXAMPLE 8

A—Pyrrolidone
B—Calcium oxide
Moving bed reactor
$F_A = 5.1$ kg./hr. (60 mole./hr.).
$F_B = 2.8$ kg./hr. (45 mole/hr.).
$F_{NB}$—55 L/hr.
$V = 5.0$ L.
$W_V = $ ca. 4.2 kg.
Reaction temperature—365° C.

Under these conditions, there was obtained in a uniform and continuous manner 4.1 kg. per hour of crude product containing 69% of the corresponding Schiff base (conversion=75%; ca. 2.8 kg./hr. of 100% Schiff base). The crude product was purified in the same manner as in Example 1 to obtain the objective Schiff base of 99.5%.

EXAMPLE 9

A—ε-caprolactam.
B—Barium oxide.
Moving bed reactor
$F_A = 4.5$ kg./hr. (40 mole/hr.).
$F_B = 6.1$ kg./hr. (40 mole/hr.).
$V = 15.3$ L.
$W_V = 25.3$ kg.
Reaction temperature—370° C.

Under these conditions, there was obtained in a uniform and continuous manner crude product containing 75% by weight of the corresponding Schiff base (2.7 kg./hr. of Schiff base). The crude product was treated in the same manner as in Example 1 to obtain the objective Schiff base of more than 99% purity.

What we claim is:

1. A process for producing a Schiff base of the formula:

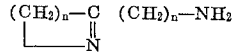

where $n$ is 3–11, by the reaction between the corresponding 5–13 membered lactam and a decarbonation-condensing agent selected from the group consisting of oxides and hydroxides of alkaline-earth metals, characterized by continuously contacting the lactam in the state of a gas with the condensing agent in solid particulate form at an elevated temperature of 320–350° C., whereby the continuous contact is carried out by means of a fluidized bed system or a moving bed system.

2. A process according to claim 1 wherein the lactam is selected from ω-laurolactam, ω-caprylolactam, ω-enentholactam, 5-methyl-ε-caprolactam and α-pyrrolidone.

3. A process according to claim 1 wherein the decarbonation-condensing agent is selected from calcium oxide, calcium hydroxide and barium oxide.

References Cited

UNITED STATES PATENTS 3,412,156  11/1968  Ueda et al. _____ 260—239

FOREIGN PATENTS 922,275  3/1963  Great Britain.

ALTON D. ROLLINS, Primary Examiner

U.S. Cl. X.R.
260—296, 326.9, 584

UNITED STATES PATENT OFFICE
CERTIFICATE OF CORRECTION

Patent No. 3,518,252                                  June 30, 1970

Nobuo Izawa et al.

It is certified that error appears in the above identified patent and that said Letters Patent are hereby corrected as shown below:

Column 10, line 30, "350° C." should read -- 550° C. --.

Signed and sealed this 22nd day of December 1970.

(SEAL)
Attest:

Edward M. Fletcher, Jr.                      WILLIAM E. SCHUYLER, JR.
Attesting Officer                                     Commissioner of Patents